United States Patent [19]
Guthery et al.

[11] Patent Number: 6,098,891
[45] Date of Patent: Aug. 8, 2000

[54] CONTROLLING INDUSTRIAL PROCESSES

[75] Inventors: Scott B. Guthery, Redmond, Wash.;
Michael A. Montgomery, Austin, Tex.

[73] Assignee: Schlumberger Malco, Inc., Owings Mills, Md.

[21] Appl. No.: 09/107,034

[22] Filed: Jun. 29, 1998

[51] Int. Cl.[7] ................................................ G06K 19/06
[52] U.S. Cl. ............................................ 235/492; 235/487
[58] Field of Search .................................... 235/486, 487, 235/492, 441, 475, 479, 380

[56] References Cited

U.S. PATENT DOCUMENTS

| | | | |
|---|---|---|---|
| 3,656,510 | 4/1972 | Kinner | 137/608 |
| 5,422,634 | 6/1995 | Okubo | 340/825.31 |
| 5,423,198 | 6/1995 | Di Vito et al. | 70/278 |
| 5,701,828 | 12/1997 | Benore et al. | 109/56 |
| 5,892,298 | 4/1999 | Levasseur | 307/64 |

FOREIGN PATENT DOCUMENTS

| | | |
|---|---|---|
| 0 356 237 A2 | 2/1990 | European Pat. Off. . |
| 0 427 465 A2 | 5/1991 | European Pat. Off. . |
| 0 662 674 A1 | 7/1995 | European Pat. Off. . |
| 2 667 419 | 4/1992 | France . |
| 2 701 133 | 8/1994 | France . |

OTHER PUBLICATIONS

0 427 465 A3—Examiner's search report for 0 427 465 A2 May 15, 1991.
0 356 237 A3—Examiner's search report for 0 356 237 A2 Feb. 28, 1990.
PCT International Search Report dated Mar. 15, 1999.

*Primary Examiner*—Thien Minh Le
*Attorney, Agent, or Firm*—Rosenthal & Osha L.L.P.

[57] ABSTRACT

Smart (integrated circuit) card supervisory control and data acquisition. Industrial processes may be controlled by one or more smart cards. Signals may be received from an industrial process by the smart card, the signals may be processed by the smart card, and control signals may be sent from the smart card to the industrial process in response to the processed signals. The smart card may provide security/tamper resistance for proprietary information associated with the industrial process. Control of the industrial process may be distributed among one or more smart cards at particular process points to receive sensed process parameters and to send control signals to implement process actions.

14 Claims, 5 Drawing Sheets

CONTROLLING INDUSTRIAL PROCESSES

BACKGROUND OF THE INVENTION

The invention relates generally to controlling industrial processes.

Computers, including the personal computer, have improved the efficiency of a wide variety of tasks and functions in industrial settings. For example, in the process control environment, computers acquire data and execute control algorithms to run equipment and to verify and adjust product quality in real time. Such techniques help avoid major equipment shutdowns and wasted materials. The continued reliance on such computer systems depends, in part, on the ability of these systems to adequately protect and keep secure proprietary information, data, and code while performing these tasks and functions. Otherwise, the algorithms are susceptible to being stolen or corrupted, either intentionally or unintentionally. Avoiding this requires, among other things, that the software being executed and the data being gathered are not altered or accessed in any unauthorized manner.

In the process control environment, algorithms and acquired data are stored in general-purpose computer-readable storage media, such as floppy disks, hard disks, optical disks, and magnetic tape. These media are accessible by supervisory control and data acquisition (SCADA) systems that execute the control algorithms, acquire and store data, and manipulate the system being controlled. However, information stored on such media may not be secure. Situations may arise in which unauthorized modifications of software or acquired data are made. Such unauthorized alterations would be difficult to detect and may result, for example, in erroneous process control and/or imprecise or out-of-range acquired data. Lack of adequate protection also may result in unauthorized use of the software, which may cause damage to the process equipment or materials and/or may result in proprietary information being revealed to unauthorized parties.

Control information may be provided to, and acquired data taken from, industrial processes over networks attached to computers. This may add to system complexity by requiring an extension of network infrastructure to each SCADA point (node) and that network communication hardware be provided at each SCADA point.

SUMMARY OF THE INVENTION

The present invention relates to a method and apparatus for a microcontroller card (i.e., a "smart card" or a "chip card") in a stand-alone, self-contained, and secure supervisory control and data acquisition (SCADA) point. Control algorithms and programs, including for example, control parameters, ingredients lists, and product formulae, may be placed in the memory of the smart card. The smart card may be inserted into a low-cost, battery-operated smart card reader/writer harness which in turn is connected to the digital inputs and outputs of the industrial process.

The microcontroller in the smart card may execute code stored in the smart card using parameters stored in the smart card and data received on input lines from the process. Data may be received from one or various sources, processing is then performed on the data, and the processed data are stored. Using these computations, the smart card may control the process through control signals connected to the process through the reader/writer harness.

To change the control algorithm for a particular SCADA point or to collect the data accumulated at the point, the smart card may be removed from the reader/writer harness and a new smart card inserted.

In general, in one aspect, the invention features a system for process control. The system may include a process having sources and actuators. The sources may be configured to sense process parameters and the actuators may be configured to implement process actions. A card reader may be coupled to the process and an integrated circuit card may be coupled to the card reader to acquire the sensed process parameters and to control the implementation of process actions.

In general, in another aspect, the invention features a system for gathering data associated with a controlled process. The system may include a controlled process having sources. The sources may be configured to sense process parameters. A card reader may be coupled to the process and an integrated circuit card may be coupled to the card reader and may be configured to acquire and to provide tamper resistance to the sensed process parameters.

In general, in another aspect, the invention features a method for use in controlling a process. The method may include receiving, in an integrated circuit card, process information from sources in the process. Tamper resistance may be provided to process control information with the integrated circuit card and some of the process control information may be sent to the process from the integrated circuit card in response to some of the received process information.

In general, in another aspect, the invention features a method of distributing control of a process. The method may include providing two or more integrated circuit cards for control and data acquisition. The process parameters may be sensed and distributed to the integrated circuit cards. In response to some of the sensed process parameters, control information may be sent to the process from some of the integrated circuit cards.

In general, in another aspect, the invention features a system for process control. The system may include a process having sources and actuators. The sources may be configured to sense process parameters and the actuators may be configured to implement process actions. More than one card reader may be coupled to the process and more than one integrated circuit card may be coupled to each card reader. The integrated circuit cards may be coupled to acquire the sensed process parameters and to control the implementation of process actions.

Implementations of the invention may include one or more of the following: an integrated circuit card coupled to control the implementation of process actions in response to sensed process parameters; an integrated circuit card including a processor and a computer-readable medium, the computer-readable medium configured to instruct the processor to control the implementation of process actions; an integrated circuit card which secures proprietary control information used when the card controls the implementation of process actions; a system in which minimum sufficient statistics of acquired process parameters are used in controlling the implementation of process actions; a system in which minimum sufficient statistics of acquired process parameters are stored in an integrated circuit card; a system in which power and timing signals are supplied to an integrated circuit card from a card reader; a system in which only some of more than one integrated circuit card are coupled to control the implementation of process actions.

In various implementations, the invention may provide one or more of the following advantages. The invention may offer hardware to read and write a smart card for control of industrial processes which is potentially less expensive than hardware to read and write other storage media used for the same purpose. The invention may help to limit unauthorized tampering with the industrial process control algorithms, and, therefore, possibly with the process itself. The invention also may provide a technique for collecting current process data in real time for control or modification of the industrial process being controlled. The invention also may provide a technique for collecting process data history for future use. For example, data could be collected in the smart card for statistical process data analysis. Such data collection may be performed in a relatively low cost and secure manner with a smart card.

The invention also may distribute control and data acquisition by positioning one or more smart cards at various points in the process. The invention also may have other applications to industrial processes. Other features and advantages will become apparent from the following description and from the claims.

DESCRIPTION OF THE PREFERRED EMBODIMENTS

Figure 1:
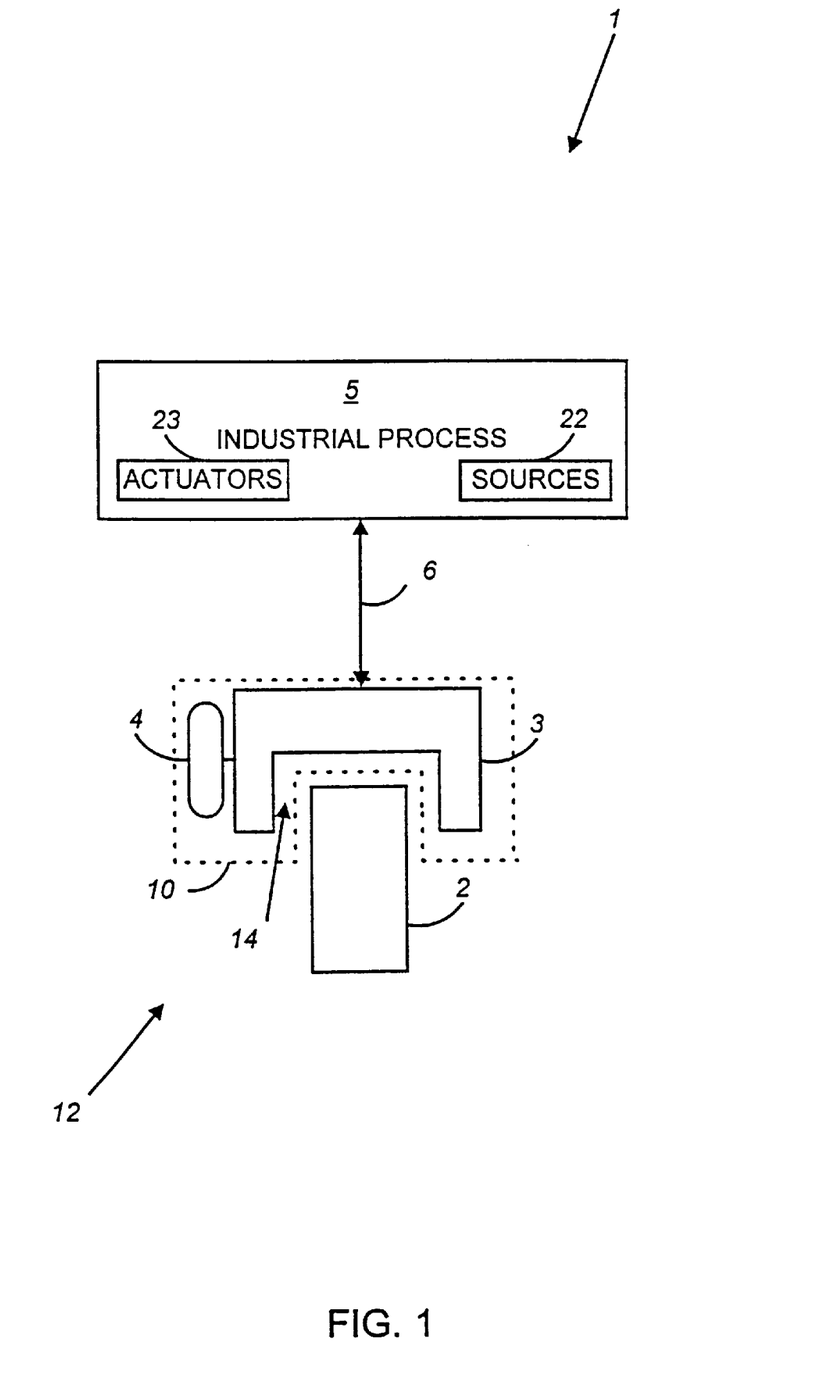
FIG. 1 is an example system in which the invention can be practiced.

In a SCADA system 1, an integrated circuit card or microcontroller card (also known as a "smart card" or a "chip-card") 2 controls and accumulates data from an industrial process as shown in FIG. 1. The smart card 2 is coupled to (or positioned in) a smart card reader or reader/writer (referred to hereinafter as reader) 3 in a smart card receiver 14 in a SCADA terminal 10. Power to the smart card is provided through the reader 3 by a power supply 4 (for example, a battery). The smart card 2 is coupled to the reader 3 through control and data acquisition lines 6. In order to control and acquire data from an industrial process 5 (e.g., a paper mill, paper making machinery, a chemical plant process, an assembly or component manufacturing line, film manufacturing, textile or finished goods manufacturing or handling, etc.; i.e., any type of industrial process). Although the power supply 4 is shown to be external to the reader 3, it also could be located within reader 3 depending on design. Moreover, for simplification of the drawings, line 6 is shown as a single line, but it may include a number of control and data lines as would be required by design or application of system 1.

Figure 2:
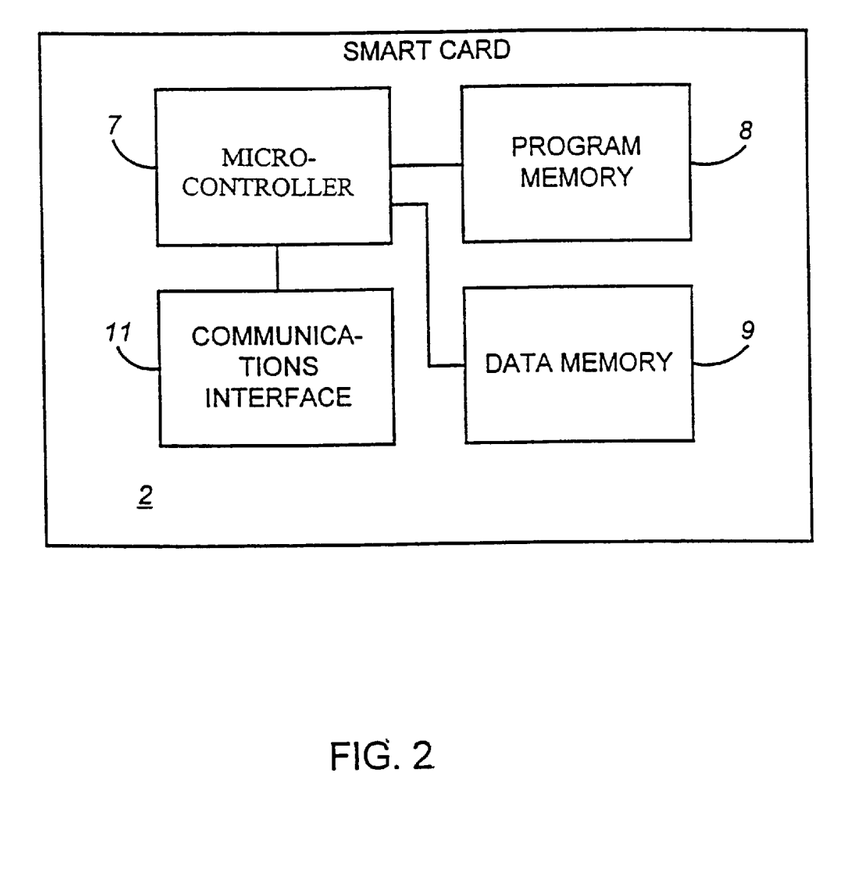
FIG. 2 is a representation of a smart card according to an implementation of the invention.

As shown in FIG. 2, the smart card 2 includes a microcontroller 7, for example, a 68HC05 or 8051 8-bit microcontroller, coupled to a computer-readable storage medium (program memory 8). Firmware for controlling the operation of the smart card 2 is stored in the program memory 8, which may be, for example, 20 kilobytes of nonvolatile read-only memory (ROM). Instructions may be loaded into the program memory 8 at a location remote from where the smart card 2 is to be used (i.e., before it is used). For example, these instructions could be stored in the program memory 8 at the time of manufacturing the smart card 2.

The microcontroller 7 is appropriately configured by code residing in the program memory 8 to perform the various smart card functions described below. Data are stored in a computer-readable storage medium (data memory 9) coupled to the microcontroller 7. The data memory may store data as described below, but may also store executable code loaded at the time of manufacture or during use. In the smart card 2 shown in FIG. 2, the data memory 9 includes alterable nonvolatile memory, for example, 8 kilobytes of electrically erasable programmable read-only memory (EEPROM). The data memory 9 also may include random access memory (RAM) or register memory. The smart card 2 includes a communications interface 11 coupled to the microcontroller 7 that will be discussed below.

The smart card 2 is a plastic card approximately the size of a credit card embedded with one or more integrated circuit (IC) chips. The chip stores information while protecting it from unauthorized access. The chip on the smart card 2 is manufactured in such a way to make it difficult to compromise its stored information or to reverse engineer its structure and function. Memory locations and their contents are disguised in a number of ways. For example, although two memory locations may have sequential addresses, they may not be physically located next to each other. Further, many of the wire runs are deliberately run up and down through the multiple layers of the smart card 2 to disguise their source and destination. Attempting to defeat this measure by skimming off a small section of the card at a time will destroy the card. Moreover, with smart cards, the normal rule of keeping intra- and inter-chip communication lines, contacts, etc., as short as possible is not observed deliberately to make reverse engineering harder to accomplish. As a consequence of these and other measures, a smart card generally is considered a highly secure way to store programs and data.

Further secure storage properties arise from coupling the microcontroller 7 between the program and data memory and the outside world, including the process 5. By these devices, the smart card can protect proprietary control instructions (or algorithms, processes, etc.), secret formulas, and ingredient lists, which may be stored in the program memory 8, and accumulated data, which may be stored in the data memory 9, from discovery or alteration.

The ergonomic credit-card form factor of the smart card 2 permits a control algorithm to be changed quickly and easily and the acquired data to be sent to another location for processing and analysis, for example, by swapping or moving the smart card 2 from one card reader to another. There are situations where it is impractical or uneconomical to extend a communication network to a SCADA point, for example, to a control or sensor point in an industrial process. In these situations, the control algorithms and acquired data may be stored at the point itself. Since such points are not typically manned, the algorithms and data are subject to compromise by being either read or altered by unauthorized or hostile parties. Thus, it is of interest to secure the algorithms and acquired data at remote, standalone SCADA points in a cost-effective manner. A smart card fulfills those requirements because it is inexpensive and is designed to provide a high degree of protection for the programs and data it contains.

The smart card 2 may be mass produced, and provides very low-cost and secure computer and data storage.

Moreover, the low price of the smart card 2 (e.g., $5 each) enables it to be economically placed at SCADA points in an industrial process.

The smart card 2 can provide on the order of 300,000 instructions per second of computing power and, for example, up to 4 kilobytes of read/write memory and up to 32 kilobytes of program memory. The computer (i.e., microcontroller and memory) in the smart card 2, while modest, can be used in dedicated mode to monitor and control process parameters at response times on the order of a few seconds and data input/output rates of hundreds of bytes per second or higher. An example data rate may be 104 kilobytes/sec. In one embodiment, the computer system in the smart card 2 can be used as a stand-alone SCADA computer in many low-data rate and low-response time applications.

The computational capabilities of the smart card 2 permit it to be programmed to sense and react to changing conditions. Smart card electrical contact positions are standardized permitting the same smart card to be used and programmed with readers manufactured by any source that follows the standard.

Figure 3:
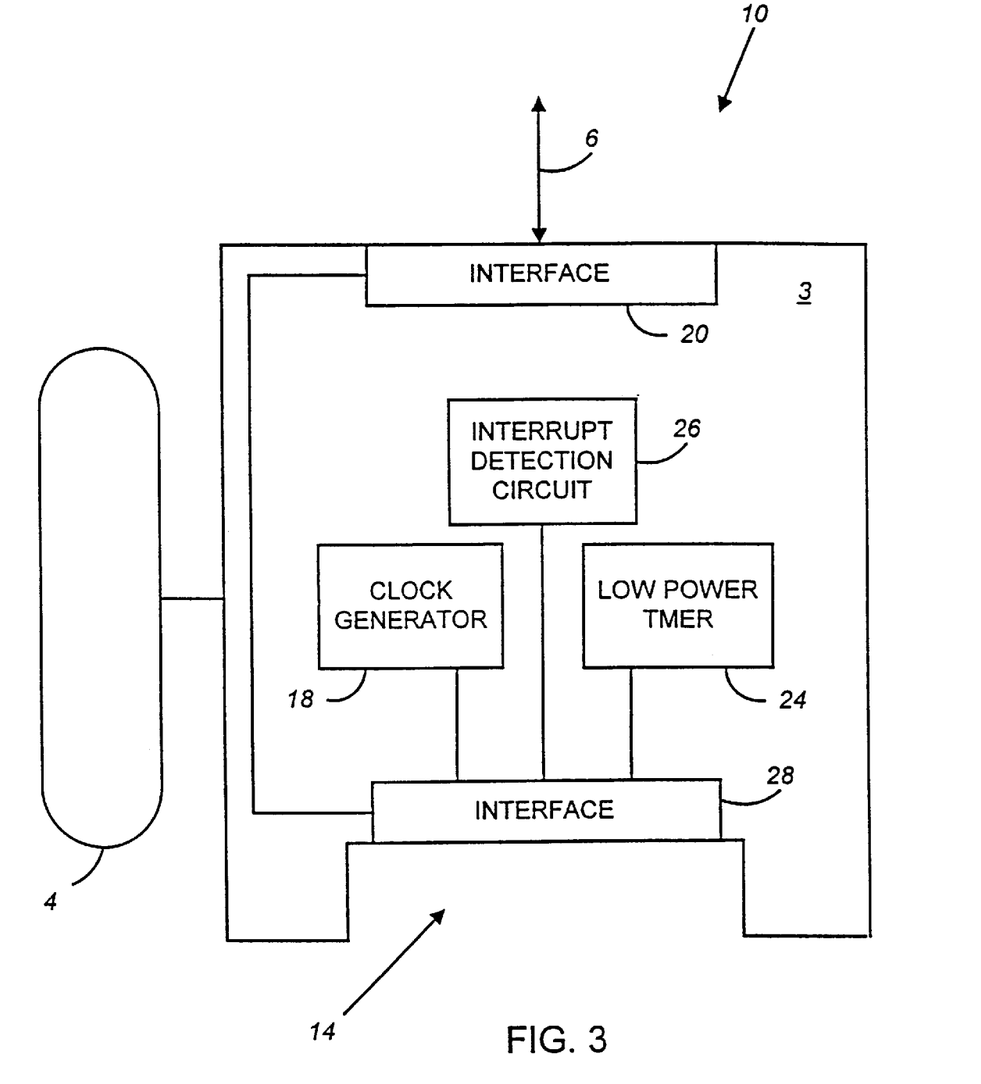
FIG. 3 is a representation of a smart card terminal according to an implementation of the invention.

Although the smart card provides the computing power and secure algorithm and data storage for each SCADA point, the SCADA terminal 10 provides the connection of the smart card 2 to necessary resources at the SCADA point 12. In particular, as shown in FIG. 3, the SCADA terminal 10 provides a smart card interface 14, the smart card reader 3, the power supply 4, a clock signal generator 18 for supplying a clock signal to the smart card 2, and an interface 20 to the process to be measured and/or controlled. When the smart card 2 is inserted in the reader's receiver 14, power is supplied from supply 4 to the smart card 2 and communication is established between the smart card 2 and the reader 3. The smart card 2 has a communications interface 11 for communicating with the smart card reader 3 through interface 28. The communications interface 11 includes electrical circuitry which requires physical contact (e.g., standardized pads) with pins in the smart card reader 3. Alternatively, the smart card 2 instead may use inductive coupling, capacitive coupling, or radio signals, alone or in combination, to communicate with the reader 3. The interface 28 could include, for example, analog to digital and digital to analog converters, serial digital data, parallel digital data, interrupts, or alarms, among other things.

The smart card 2 is also coupled to the industrial process 5 through the interface 20 and lines 6 when inserted in the reader 3. The interface 20 could pass data and status information from sources 22 to the smart card 2 through reader 3. Sources 22 could be, for example, temperature, pressure, voltage, current, or other kinds of sensors, switches of various kinds, user interfaces, communications links, sources associated with actuators of the process 5, or any other data source. The sensors provide appropriate input data or input signals to the SCADA point of the system 1. The smart card 2 may, for example, simply record temperature data for the process 5 for a few years, then be removed for evaluation and replaced with a new smart card.

Through the interfaces 20 and 28, the smart card 2 in the SCADA point 12 also may be able to control the process, for example, by sending control signals to actuators 23. Input signals may be sensed and output signals may be sent at any time or at a particular time depending on how the smart card is programmed. Acquisition of data and control could occur serially or in parallel depending on the design of the smart card 2, the reader 3, the lines 6, the process 5, and perhaps the sources 22 and the actuators 23.

Actuators 23 also may send signals to the smart card 2 to indicate their status. The smart card may produce, via the reader, new control signals in reaction to the status of the actuators. Examples of actuators 23 are solenoids, hoppers, switches, heating elements, valves, mixers, sprayers, etc., or any other type of device, system, or process that is designed to take action in or to help control the process 5. The process does not necessarily have to have both actuators and sources; even if both are present, one or the other may not be used.

In general, when the industrial process is running, the smart card 2 is inserted in the reader 3. The sources 22 provide information regarding the process (or actuators) to the smart card 2 at selected points in the process (for example, at the SCADA points 12, critical process locations, or elsewhere) through the interface 20 during operation of the process. The actuators 23 also receive information, data, or instructions from the smart card 2 through the interface 20 over lines 6. The information, data, or instructions generated by the smart card 2 under control of the microcontroller 7 can take various forms, including, for example, control or set point values, process parameters or process environmental change signals.

Power management often is a crucial factor for SCADA points. Remote points usually are powered by batteries, whose limited power storage must be conserved and allocated judiciously. The low power requirements of a smart card allow it to operate unattended for long periods of time without replacing or recharging the power source. The smart card 2 conserves power by consuming only a small fraction of the power required by conventional SCADA controllers. Since the smart card 2 stores data in a non-volatile manner, power may be removed from the card during intervals when measurement and/or control are not required, without the loss of previously acquired data. Measurement and control are performed at discrete intervals, for example, once per minute. A low power timer 24 in the SCADA terminal may be used to activate power for the remainder of the SCADA terminal 10 and the smart card 2 only as needed, reducing power consumption dramatically. Smart card 2 response also may be provided on an interrupt basis, which means that power is necessary only for a circuit 26 (FIG. 3) for detecting the interrupt, and power is supplied to the remainder of the SCADA point 12 only as needed. Other designs may only require a response on an interrupt basis or only use a low power timer, as above, but not use both.

Due to the limited amount of memory available on the smart card 2, the computer on the card may be used to reduce acquired data to the minimum sufficient content or statistics before storage in the data memory 9 of the smart card 2. In addition, one or more known data compression techniques could be used to reduce further the amount of storage required to store the data. For example, the serially computed average, variance, mode, statistical moments, maximum, and minimum statistics of each data (or sets of data) input may be sufficient to characterize the process. Using the smart card 2 for such data collection enables, for example, the card to be removed from the reader 3 for further evaluation and replacement with a new card. The smart card 2 also could be replaced if it fails. Alternatively, in certain embodiments, it may be desirable to record only a small amount of process information. For example, perhaps only the high and low temperature of a process would be recorded over a period of time.

Based upon the information or data provided to the smart card 2 from the sources 22, the smart card 2 can determine whether anyone has improperly altered or tampered with the process. The smart card 2 thus can determine (e.g., with control code stored in the program memory 8) if the inputs generated by the sources 22 are out of range or are trending in a wrong direction. As a consequence, the smart card can cause a variety of actions to be taken, including altering or shutting down the industrial process, or going into an idle state to prevent tampering or waste. The secure design of the smart card 2 helps to ensure that the smart card 2 itself and the industrial process that it controls are not compromised.

Figure 4:
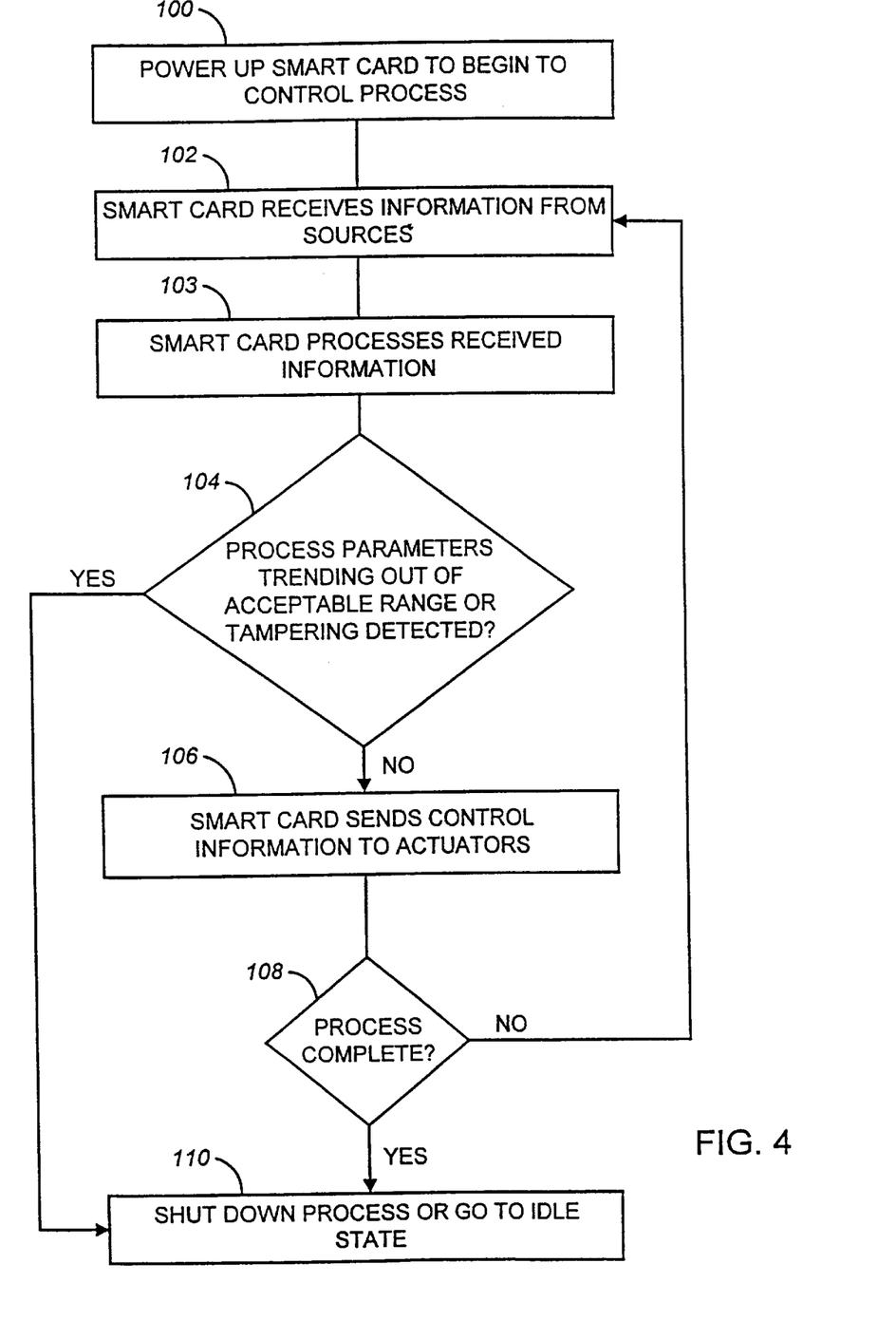
FIG. 4 is a flow chart illustrating a method according to an implementation of the invention.

FIG. 4 is a flow chart of an implementation of a method of controlling an industrial process according to the invention. As shown by 100 in FIG. 4, the smart card 2 powers up to begin to control the industrial process. As the smart card 2 is inserted into the smart card receiver 14 in the reader 3, it powers up with power from the power supply 4, and it receives the clock signal from timing generator 18 through reader 3 and interface 28. The clock signal may be used in timing the digital circuitry of the smart card 2, for example, microcontroller 7. Once power-up is completed, initialization of the smart card 2 may occur and control of the process may begin. Alternatively, control also may begin when some other local (or remote) triggering signal (not shown) is received by the smart card 2 over lines 6 and through interface 20 and interface 28. Moreover, control may begin once certain process parameters (or changes in them) are detected from sources 22 or when process environmental conditions change (e.g., ambient temperature or pressure, humidity, etc.), as discussed above.

As indicated by 102, the smart card 2 requests sources 22 to send certain information to the smart card 2, at a specified time or from a specified point during a timing cycle of the process (i.e., information could be sent intermittently or continuously depending on process requirements). This information can include, for example, data on temperature, voltage, pressure, etc., as discussed above, or other process status information, at critical locations in the industrial process. The received information is processed 103 by the microcontroller 7 of the smart card 2 according to instructions loaded into the program memory 8 and/or data memory 9. If the smart card 2 does not properly control the process 5 (e.g., if the card is removed from the receiver 14 in terminal 10 or the card is tainted by unauthorized parties which would trigger tampering detection), or if tampering is otherwise detected 104, the process shuts down or the smart card 2 (and perhaps process 5) goes into an idle mode 110. Shut down also could occur if the smart card 2 detects a larger than normal change in a process parameter of the process 5 (e.g., if a process parameter trends out of an acceptable range) or through internal checks within the smart card 2 of the integrity of stored data in the program memory 8 or data memory 9. Such checks also could occur by using other smart cards to check or verify proper operation of the smart card 2.

If it becomes necessary, after smart card processing of the received information, to change the parameters of the process, or to perform certain operations at particular times or steps in the process, as indicated by 106, the smart card 2 sends control information to the actuators 23 to effect the changes or perform the operations. Operations may include, for example, adding a key or proprietary ingredient in the process in a certain amount, knowledge of which is stored in the program memory 8. The smart card 2 may store information securely on the amount of the proprietary ingredient to be added or when it should be added. The control information also may be sent to the actuators 23 in response to information received by the smart card 2 from the sources 22. If the process is not complete, as indicated by 108, flow proceeds back to 102 and the process continues. Once the process is complete 108, it shuts down or goes (perhaps along with the smart card 2) into an idle state 110. The idle state of the smart card 2 (and its control functions) may be characterized as a low power state of the smart card 2 (and process) which awaits further instructions (from program memory 8 or from remote origin) to start the process again, if necessary.

Figure 5:
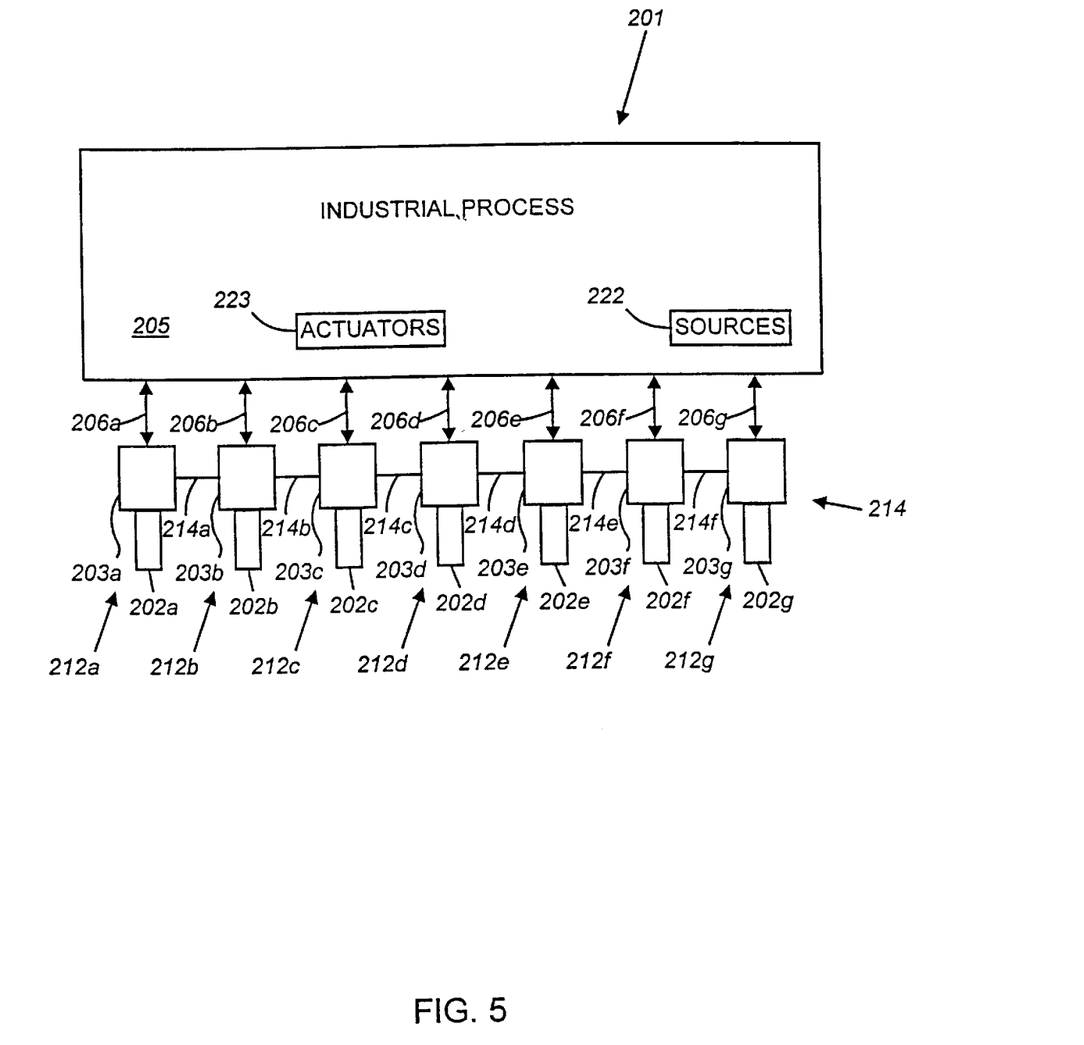
FIG. 5 is a representation of a system in which control and data acquisition is distributed to two or more SCADA points according to an implementation of the invention.

Control and data acquisition may be distributed to more than one smart card (i.e., to two or more smart cards). An example of this with smart cards 202$a$–$g$ at corresponding SCADA points 212$a$–$g$ is shown in FIG. 5. One or more of the smart cards 202$a$–$g$ may be used for control alone, data acquisition alone, or a combination of both. Whatever the particular implementation, the system of smart cards 202$a$–$g$ works to coordinate control of, and data acquisition from, the industrial process much as a single smart card does for the system 1. System 201 potentially is more powerful and more tamper resistant than systems using a single smart card because smart cards 202$a$–$g$ may provide collectively more memory and more processor power than a single smart card.

The system 201 fuither includes signal lines 206$a$–$g$ for each of SCADA terminals 212$a$–$g$. SCADA terminals 212$a$–$g$ may be similar to SCADA terminal 12 and lines 206$a$–$g$ may be similar to lines 6. The smart cards 202$a$–$g$ are linked through the reader 203$a$–$g$ in a network 214 as generally indicated by network communication lines 214$a$–$f$, each located between pairs of the readers 203$a$–$g$. Other linking schemes could be used. Linking of the smart cards 202$a$–$g$ enables the coordinated control of, and data acquisition from, an industrial process 205 through sources 222 (which may be similar to sources 22) and actuators 223 (which may be similar to actuators 23).

In certain embodiments, there is no network 214 and each smart card of the multitude of smart cards 202$a$–$g$ is independent of the other smart cards, yet each operates to perform its own SCADA function on the process 205 with the sources 222 and actuators 223. In these embodiments, the coordination of the SCADA function for the process between the smart cards 202$a$–$g$ is indirect (i.e., there is no network). Nevertheless, each independent smart card, through its interaction with actuators 223 and sources 222 in performing its own SCADA function, keeps the system 201 performing the industrial process in a controlled fashion. Moreover, in certain additional embodiments, one or more feedback loops (not shown) could be provided between smart cards 202$a$–$g$ in the network so that if one of the cards senses a change in the process, it feeds back that information to another one (or more) of the smart cards to make a corresponding modification in the process through instructions from the latter smart card (or smart cards).

Although only the preferred embodiments have been disclosed, other implementations of the invention are contemplated within the scope of the following claims.

What is claimed is:

1. A system for process control, comprising:
   a process comprising sources and actuators, the sources configured to sense process parameters and the actuators configured to implement process actions;
   a card reader coupled to the process; and
   an integrated circuit card coupled to the card reader to acquire the sensed process parameters and to control the implementation of process actions.

2. The system of claim 1, wherein the integrated circuit card is coupled to control the implementation of process actions in response to the sensed process parameters.

3. The system of claim 1, wherein the integrated circuit card further comprises a processor and a computer-readable medium, the computer-readable medium configured to instruct the processor to control the implementation of process actions.

4. The system of claim 1, wherein the integrated circuit card secures proprietary control information used when the card controls the implementation of process actions.

5. The system of claim 1, wherein minimum sufficient statistics of the acquired process parameters are used in controlling the implementation of process actions.

6. A system for gathering data associated with a controlled process, comprising:
   a controlled process comprising sources, the sources configured to sense process parameters;
   a card reader coupled to the process; and
   an integrated circuit card coupled to the card reader and configured to acquire and to provide tamper resistance to the sensed process parameters.

7. The system of claim 6, wherein minimum sufficient statistics of the acquired process parameters are stored in the integrated circuit card.

8. The system of claim 6, wherein power and timing signals are supplied to the integrated circuit card from the card reader.

9. A method for use in controlling a process, comprising:
   receiving, in an integrated circuit card, process information from sources in the process;
   providing tamper resistance to process control information with the integrated circuit card; and
   sending some of the process control information to the process from the integrated circuit card in response to some of the received process information.

10. A method of distributing control of a process, comprising:
    providing two or more integrated circuit cards for control and data acquisition;
    sensing process parameters;
    distributing the sensed process parameters to the integrated circuit cards; and
    in response to some of the sensed process parameters, sending control information to the process from some of the integrated circuit cards.

11. A system for process control, comprising:
    a process comprising sources and actuators, the sources configured to sense process parameters and the actuators configured to implement process actions;
    card readers coupled to the process; and
    integrated circuit cards each coupled to the card readers, the integrated circuit cards being coupled to acquire the sensed process parameters and to control the implementation of process actions.

12. The system of claim 11, wherein only some of the more than one integrated circuit card are coupled to control the implementation of process actions.

13. A system for process control, comprising:
    a process comprising sources, the sources configured to sense process parameters;
    a card reader coupled to the process; and
    an integrated circuit card coupled to the card reader to acquire the sensed process parameters.

14. A system for process control, comprising:
    a process comprising actuators, the actuators configured to implement process actions;
    a card reader coupled to the process; and
    an integrated circuit card coupled to the card reader to control the implementation of process actions.

* * * * *